(12) United States Patent
Gerber

(10) Patent No.: US 7,059,030 B2
(45) Date of Patent: Jun. 13, 2006

(54) PRESSING DEVICE

(75) Inventor: Ernst Gerber, Reigoldswil (CH)

(73) Assignee: Rego-Fix AG, Tenniken (CH)

( * ) Notice: Subject to any disclaimer, the term of this patent is extended or adjusted under 35 U.S.C. 154(b) by 244 days.

(21) Appl. No.: 10/838,677

(22) Filed: May 4, 2004

(65) Prior Publication Data

US 2004/0255444 A1   Dec. 23, 2004

(30) Foreign Application Priority Data

May 15, 2003 (CH) .................................. 0862/03

(51) Int. Cl.
*B23P 19/04* (2006.01)
(52) U.S. Cl. ......................................... 29/237; 29/238
(58) Field of Classification Search ................. 29/237, 29/238, 239, 278, 283.5, 281.1, 251–252; 100/49

See application file for complete search history.

(56) References Cited

U.S. PATENT DOCUMENTS

| | | | |
|---|---|---|---|
| 1,952,109 A | 3/1934 | Woodward | |
| 3,882,758 A | 5/1975 | Muller | .................. 90/11 A |
| 4,418,458 A * | 12/1983 | Hunter | .......................... 29/237 |
| 4,768,269 A | 9/1988 | Williams | ...................... 29/225 |
| 5,323,697 A * | 6/1994 | Schrock | ...................... 100/232 |
| 6,434,808 B1 * | 8/2002 | McKay | ......................... 29/237 |
| 2004/0255444 A1 * | 12/2004 | Gerber | .......................... 29/238 |

FOREIGN PATENT DOCUMENTS

| | | |
|---|---|---|
| DE | 101 38 343 A | 2/2003 |
| FR | 2 649 031 A | 1/1991 |

* cited by examiner

*Primary Examiner*—Lee D Wilson
(74) *Attorney, Agent, or Firm*—Hoffmann & Baron, LLP

(57) ABSTRACT

Pressing device for the relative axial displacement of two mutually coaxial parts that can only be displaced towards one another by using a high pressing power, for example collet chucks or clamping sleeves, into corresponding holes in tool or collet chuck holders. The device has a housing (7) consisting of two at least partially separable shells, which can be placed coaxially around the parts to be pressed. In the closed state, the housing has coaxial annular contacting edges (19, 20) for engaging with one of the parts to be pressed. In the inner chamber (21) of the housing there is an axially displaceable pressing plate (22) with an annular contacting edge (23) for engaging with the second part to be pressed. The press plate is displaced by a number of pressure cylinders (13, 14) arranged in a ring at equal angular distances between the housing and the press plate.

3 Claims, 3 Drawing Sheets of the page:

PRESSING DEVICE

CROSS-REFERENCE TO RELATED APPLICATIONS

This application claims the benefit of Swiss-Application No. CH-0862/03, filed May 15, 2003, the contents of which is incorporated by reference herein.

FIELD OF THE INVENTION

The present invention relates to a pressing device for the relative axial displacement of two mutually coaxial parts that can only be displaced towards one another by using a high pressing power.

BACKGROUND OF THE INVENTION

Pressing processes of this kind are used e.g. in the pressing of pipe ends or shaft connections. A high pressing power is required because the friction of a tight fit has to be overcome and in many cases the material additionally has to be deformed. A typical example is the pressing of collet chucks or clamping sleeves into and out of corresponding tool or collet chuck holders in machine tools.

In certain embodiments of tool holding fixtures, especially those with a small or zero conicity of collet chuck and retaining cone, as are preferred for machines with very high speeds of rotation, the collet chucks or clamping sleeves with the inserted tool shank cannot easily be introduced into the retainer of the collet chuck holder and fixed with a tension nut or, conversely, withdrawn again after loosening of the tension nut, but have to be pressed in and out again using a high pressure. There are various solutions for these pressing-in and pressing-out operations, but they suffer from disadvantages.

In the clamping device described in DE-A-4405242, the forces required to close the collet chuck are applied mechanically by means of a differential threaded pinion arranged in the clamping device. The clamping device described in WO-A-98/32563 has a hydraulic system which effects an axial displacement of an outer sleeve with a flat inner cone on the corresponding outer cone of the actual tool holding fixture. Such solutions, where the devices for producing the necessary axial forces are part of the clamping device, have the disadvantage of making the clamping devices comparatively expensive. Moreover, the demand for improvement to the true running properties of clamping devices implies structural simplification, i.e. a clamping device should consist of the minimum number of individual parts and have the simplest possible geometrical design. The complexity of integrated pressing devices is in basic conflict with this principle.

SUMMARY OF THE INVENTION

The object of the invention is to provide a simple universal pressing device devoid of the disadvantages of known devices of this type.

According to the invention, this object is achieved by a pressing device of the type mentioned at the outset which is characterized by a housing consisting of two at least partially separable shells, which can be placed coaxially around the parts to be pressed and which, in the closed state, has at least one coaxial annular contacting edge for engaging with one of the parts to be pressed, a press plate which is axially displaceable in the inner chamber of the housing and has a coaxial annular contacting edge for engaging with the second part to be pressed, and a number of pressure cylinders arranged in a ring at equal angular distances between the housing and the press plate.

A pressing-in and pressing-out device for flat-cone collet chucks is described below as a preferred embodiment of the invention with the aid of the accompanying drawings.

DETAILED DESCRIPTION OF PREFERRED EMBODIMENTS

Figure 1:
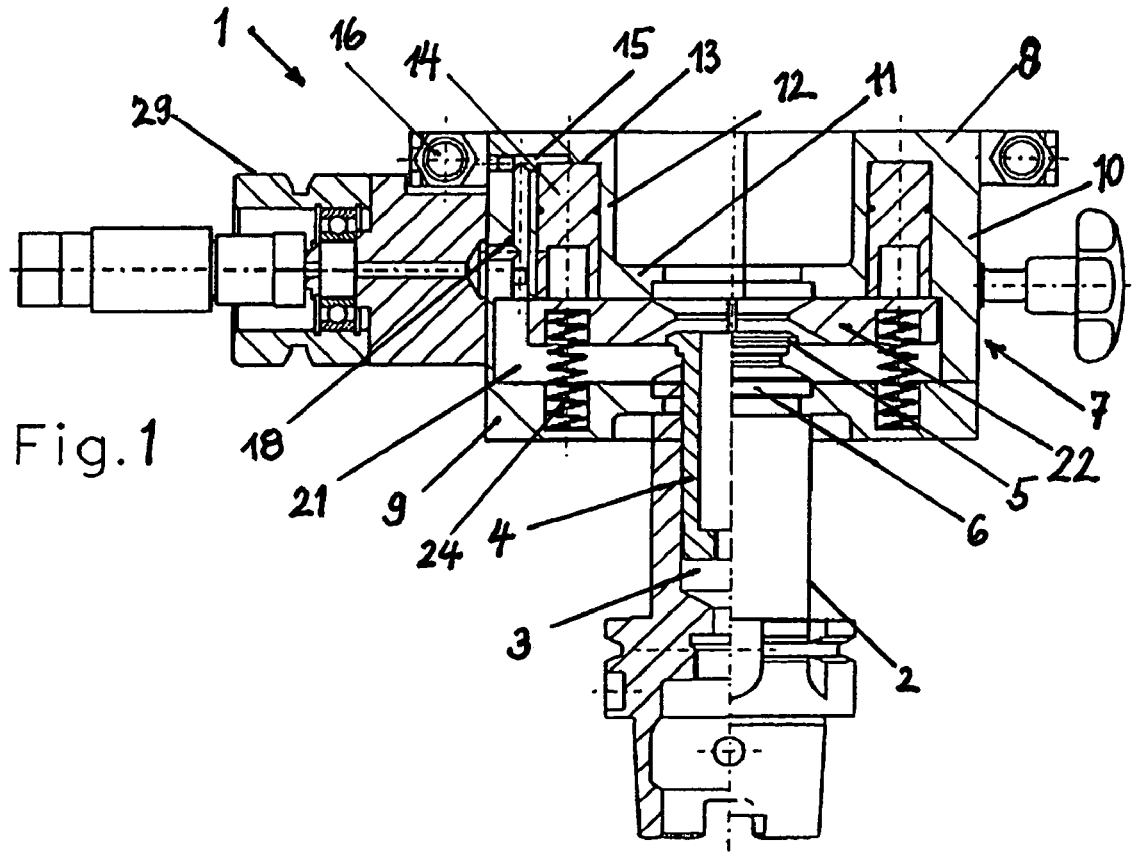
FIG. 1 is a sectional diagram of a pressing device with an inserted collet chuck holder in the pressing-in position.

A pressing device 1 comprises a collet chuck holder 2 with a collet chuck 4 inserted in its location hole 3, which collet chuck is to be pressed into the retainer until its flange 5 comes up against the head 6 of the collet chuck holder.

Two approximately mirror-symmetrical substructures 8 and two covers 9 screwed to the appropriate substructures form the two halves of a divisible housing 7. The substructures have a revolving outer wall 10, cylindrical on the inside and polygonal on the outside, comprising an inward-facing shoulder 11 with an enlarged base region 12 underneath it. Extending from the surface of the shoulder 11, and arranged at equal angular distances, are holes 13 parallel to the axis, which serve as pressure cylinders and into which pressure pistons 14, provided with pressure seals, are inserted. In the present Example, ten such pressure cylinders are distributed over the whole perimeter of the housing, although a different number of pressure cylinders is of course possible.

The pressure cylinders of each half of the substructures are interconnected by means of channels 15 which are filled with hydraulic fluid and serve to feed pressure to the cylinders. In both halves of the substructures the channels have an external connector 16. These two connectors are linked together by a flexible pressure hose 17 for transmitting pressure from one half of the substructures to the other. Also, one of the two halves of the substructures has an additional external channel connector 18 through which the device is pressurized.

At its center the shoulder 11 has a semicircular recess whose rim forms a contacting edge 19 with a profile which matches a correspondingly profiled annular groove in the head of the collet chuck holder. The covers 9 also have semicircular contacting edges 20 with the same dimensions and a profiling that is rotated through 180° relative to the contacting edge of the shoulder 11.

Between the shoulder 11 and the cover 9 there is an inner chamber 21 in which a press plate 22, likewise consisting of two halves, is arranged so as to be axially displaceable. Each half of this press plate also has a semicircular recess whose diameter is smaller than the diameter of the flange 5 of the collet chuck, and whose rim forms a contacting edge 23 in the closed state, its edge profile matching the shape of the flange 5. In the case illustrated here, both the flange and, correspondingly, the contacting edge 23 of the press plate 22 have conical areas.

Arranged between the cover 9 and the press plate 22 are several coil springs 24 which are prestressed when the cover is screwed to the substructure, so that they normally hold the press plate 22 in its lowest position, i.e. against the surface of the shoulder 11 or against the faces of the pressure pistons 14 that are flush with said shoulder.

Figure 4:
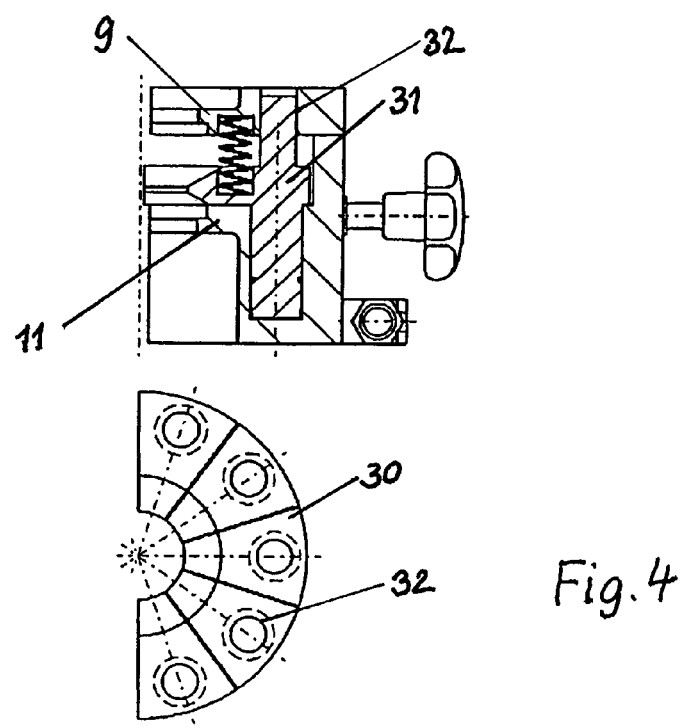
FIG. 4 is a cutout of an alternative embodiment.
Figure 5:
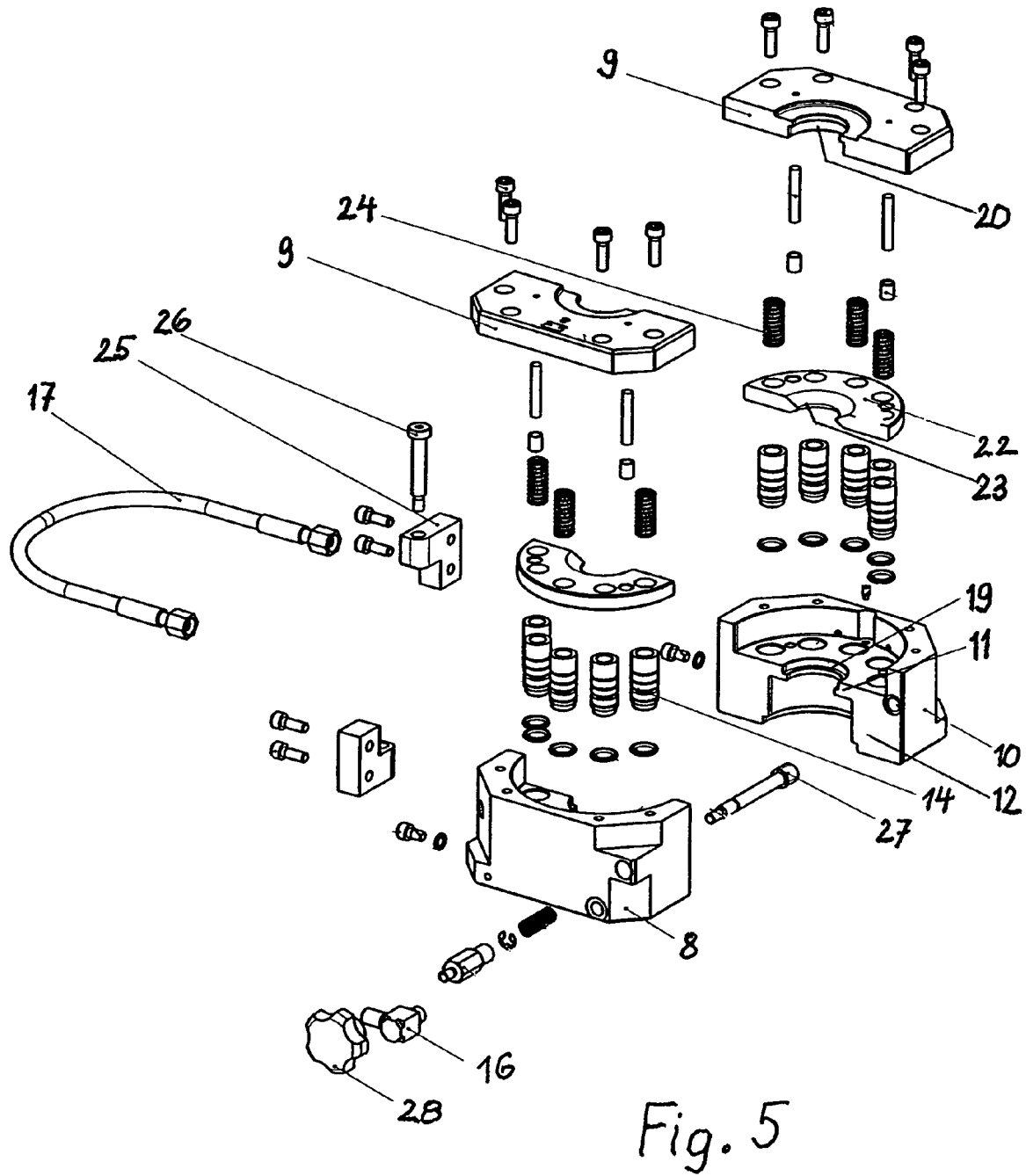
FIG. 5 is an exploded drawing of the essential components of the pressing device.

In the alternative embodiment shown in FIG. 4, the press plate 22 consists not of two halves but of a number of segments 30 equal to the number of pressure cylinders. Each segment forms a unit 31 together with a pressure piston. Advantageously, the pressure piston is prolonged upwards and extends into a guide 32 in the cover 9.

On one side the two halves of the housing are joined by a hinge consisting of two blocks 25 and a hinge pin 26 holding them together. On the other side, which is opened in order to be placed on a collet chuck holder, there is a locking bolt 27 with a hand wheel 28 for opening and closing the housing. Another type of lock, for example a latch, etc., can be used instead.

Arranged on one of the two substructures 8 is an attachment 29 which is fixed to the pressing device 1 in such a way that the latter can be rotated through 180°. Also, the attachment contains a line for feeding the hydraulic fluid to the connector 18 and the channels 15 in the housing substructures, through which the required pressing power is admitted to the cylinders. The individual parts of the attachment are of secondary importance for the present invention and are not therefore described in detail.

The device operates as follows: The locking bolt is loosened with the hand wheel so that the device can be opened on one side and placed from the side around the head of a collet chuck holder. The device is then closed around the head and the bolt is tightened with the hand wheel. According to whether a pressing-in or pressing-out operation is to be carried out, the device is brought into the position shown in FIG. 1 or FIG. 2. In the position shown in FIG. 1, the edge of the cover engages with the revolving groove in the collet chuck holder. The press plate is situated above the collet chuck. When the pressing cylinders are pressurized, the press plate is pushed downwards by the pistons and presses the collet chuck into the retainer. This exerts a radial pressure on the collet chuck and, as a result of its elastic deformation, on the tool shank.

Figure 2:
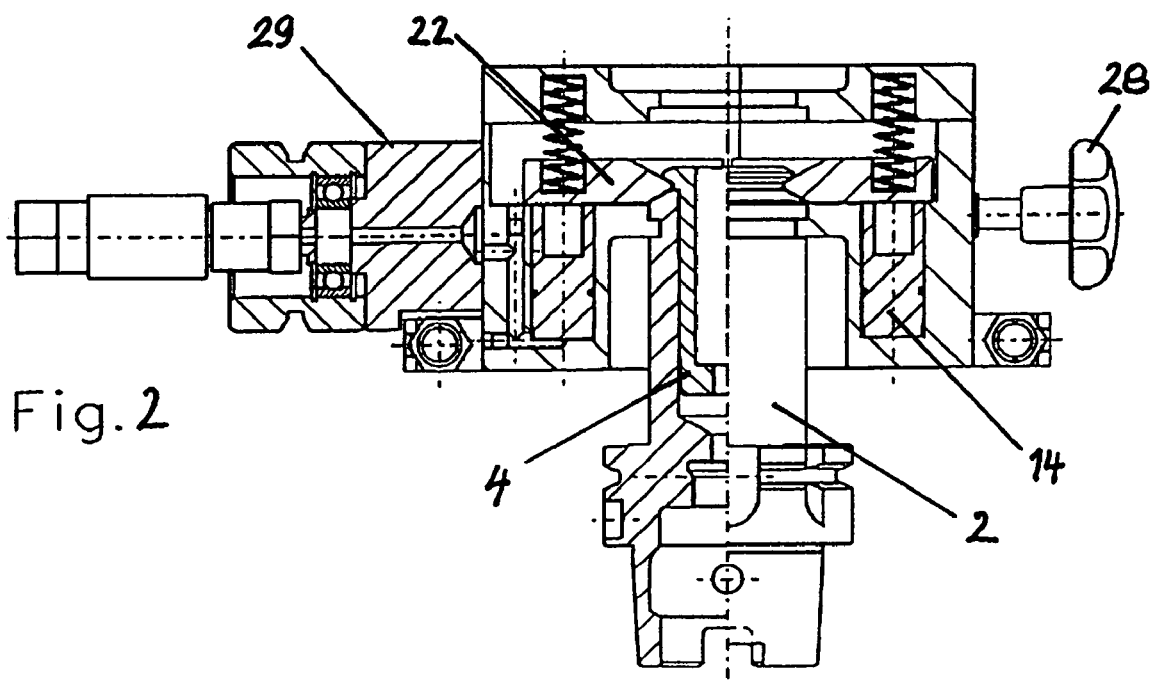
FIG. 2 is a corresponding sectional diagram in the pressing-out position.
Figure 3:
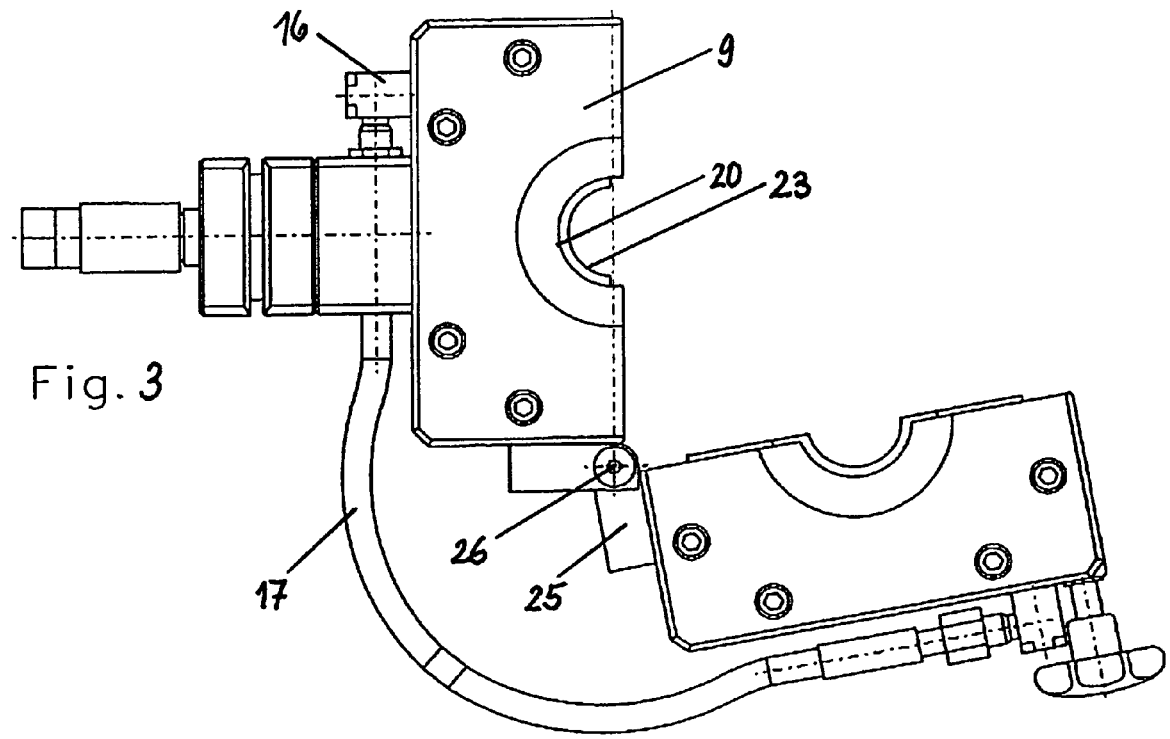
FIG. 3 is a top view of the opened pressing device.

In the pressing-out position shown in FIG. 2, the device is rotated through 180° so that the edge of the substructure engages with the annular groove in the collet chuck holder. The edge of the press plate engages behind the flange of the collet chuck. When the pistons are pressurized, the press plate is pushed upwards and pulls the collet chuck out of the retainer. This lifts the radial pressure on the collet chuck and the tool shank so that the tool can be withdrawn.

What is claimed is:

1. A pressing device for the relative axial displacement of two mutually coaxial parts that can only be displaced towards one another by using a high pressing power, comprising:

a housing having at least two partially separable shells, which can be placed coaxially around the parts to be pressed and which, in the closed state, has at least one coaxial annular contacting edge for engaging with one of the parts to be pressed;

a press plate which is axially displaceable in the inner chamber of the housing and has a coaxial annular contacting edge for engaging with the second part to be pressed; and a number of pressure cylinders arranged in a ring at equal angular distances between the housing and the press plate.

2. The pressing device according to claim 1, wherein the contacting edge belonging to the housing is formed on an inward-facing shoulder of the housing.

3. The pressing device according to claim 1, wherein on the opposite side of the inner chamber, the housing has another coaxial contacting edge, and each of the two contacting edges belonging to the housing engages with one of the parts to be pressed.

* * * * *